US010060445B2

(12) United States Patent
Spangler et al.

(10) Patent No.: US 10,060,445 B2
(45) Date of Patent: *Aug. 28, 2018

(54) COOLING HOLE PATTERNED SURFACES (71) Applicant: United Technologies Corporation, Hartford, CT (US)

(72) Inventors: Brandon W. Spangler, Vernon, CT (US); Gina Cavallo, Watertown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 252 days.

This patent is subject to a terminal disclaimer.

(21) Appl. No.: 14/924,210

(22) Filed: Oct. 27, 2015

(65) Prior Publication Data

US 2017/0114798 A1 Apr. 27, 2017

(51) Int. Cl.
*F04D 29/58* (2006.01)
*F23R 3/02* (2006.01)
(Continued)

(52) U.S. Cl.
CPC ........... *F04D 29/582* (2013.01); *F01D 5/186* (2013.01); *F01D 9/065* (2013.01); *F01D 25/12* (2013.01);
(Continued)

(58) Field of Classification Search
CPC .......... F01D 5/186; F01D 9/065; F01D 25/12; F02C 7/18; F04D 29/164; F04D 29/526;
(Continued)

(56) References Cited

U.S. PATENT DOCUMENTS 5,779,437 A * 7/1998 Abdel-Messeh ........ F01D 5/186
415/115
7,921,654 B1 * 4/2011 Liang ...................... F01D 5/186
415/115
(Continued)

FOREIGN PATENT DOCUMENTS

EP 3059391 8/2016
EP 3088668 11/2016
(Continued)

OTHER PUBLICATIONS

Extended European Search Report dated Feb. 24, 2017 in European Application No. 16185760.2.

Primary Examiner — Scott Walthour
(74) Attorney, Agent, or Firm — Snell & Wilmer L.L.P.

(57) ABSTRACT

A surface structure having a filmhole pattern is disclosed. The filmhole pattern may be an offset herringbone pattern. For instance, the surface structure may have rows of filmholes arranged in filmrows, each filmrow divided into groups of filmholes. A first group may be oriented to direct cooling air generally outward over a surface of the surface structure and a second group may be oriented to direct cooling air generally inward over a surface of the surface structure. Between the first group and the second group of filmholes in each filmrow, a transition region exists. The adjacent filmrows are arranged to enhance the effectiveness of the convective cooling proximate to the transition regions by causing each filmrow to direct cooling air over the transition region of an adjacent filmrow.

13 Claims, 9 Drawing Sheets (51) Int. Cl.

| | | |
|---|---|---|
| *F01D 25/12* | (2006.01) | |
| *F23R 3/04* | (2006.01) | |
| *F02C 7/18* | (2006.01) | |
| *F04D 29/16* | (2006.01) | |
| *F04D 29/52* | (2006.01) | |
| *F04D 29/54* | (2006.01) | |
| *F04D 29/64* | (2006.01) | |
| *F23R 3/00* | (2006.01) | |
| *F23R 3/06* | (2006.01) | |
| *F01D 5/18* | (2006.01) | |
| *F01D 9/06* | (2006.01) | |

(52) U.S. Cl.
CPC ............. *F02C 7/18* (2013.01); *F04D 29/164* (2013.01); *F04D 29/526* (2013.01); *F04D 29/542* (2013.01); *F04D 29/644* (2013.01); *F23R 3/002* (2013.01); *F23R 3/02* (2013.01); *F23R 3/04* (2013.01); *F23R 3/06* (2013.01); *F05D 2220/32* (2013.01); *F05D 2230/10* (2013.01); *F05D 2240/11* (2013.01); *F05D 2240/12* (2013.01); *F05D 2240/15* (2013.01); *F05D 2240/35* (2013.01); *F05D 2240/81* (2013.01); *F05D 2260/202* (2013.01); *F23R 2900/03041* (2013.01); *F23R 2900/03042* (2013.01); *Y02T 50/675* (2013.01); *Y02T 50/676* (2013.01)

(58) Field of Classification Search
CPC .... F04D 29/542; F04D 29/582; F04D 29/644; F05D 2240/11; F05D 2240/12; F05D 2240/15; F05D 2240/35; F05D 2240/81; F05D 2260/202; F23R 3/002; F23R 3/02; F23R 3/04; F23R 3/06; F23R 2900/03041; F23R 2900/03042; Y02T 50/675; Y02T 50/676
See application file for complete search history.

(56) References Cited

U.S. PATENT DOCUMENTS

| | | | |
|---|---|---|---|
| 8,205,458 B2* | 6/2012 | Lee | F01D 9/041 415/115 |
| 9,845,686 B2* | 12/2017 | Spangler | F01D 5/186 |
| 9,845,693 B2* | 12/2017 | Spangler | F01D 9/042 |
| 2002/0090295 A1* | 7/2002 | Torii | F01D 5/186 415/115 |
| 2009/0155050 A1* | 6/2009 | Broomer | F01D 9/04 415/115 |
| 2010/0124484 A1* | 5/2010 | Tibbott | F01D 5/188 415/115 |
| 2012/0171045 A1* | 7/2012 | Spangler | B05B 12/24 416/241 R |
| 2014/0010632 A1* | 1/2014 | Spangler | F01D 5/186 415/115 |
| 2014/0123676 A1* | 5/2014 | Jackson | F02C 7/18 60/782 |
| 2014/0369852 A1* | 12/2014 | Zhang | F01D 5/187 416/97 A |
| 2016/0298464 A1* | 10/2016 | Spangler | F01D 5/187 |

FOREIGN PATENT DOCUMENTS

| | | |
|---|---|---|
| EP | 3091185 | 11/2016 |
| EP | 3130755 | 2/2017 |
| WO | 2014008016 | 1/2014 |

\* cited by examiner

COOLING HOLE PATTERNED SURFACES

STATEMENT REGARDING GOVERNMENT RIGHTS

This disclosure was made with government support under FA-8650-09-D-2923-0021 awarded by the United States Air Force. The government has certain rights in the disclosure.

FIELD

The present disclosure relates generally to surface structures for gas turbine engines, and more specifically, to a surface structure having an offset herringbone filmhole pattern.

BACKGROUND

In a gas turbine engine, surface structures may have filmholes in their surfaces to allow cooling air to pass from cavities inside the structures and out through the filmholes, cooling the surface structure. Groups of filmholes may point in different directions. However, because the filmholes point in different directions, areas of the surface structure may not receive cooling air. Such areas may be insufficiently cooled and subject to early wear and/or failure.

SUMMARY

A surface structure is disclosed with an offset herringbone filmhole pattern, having a first filmrow including a first outward facing portion, a first inward facing portion, a first transition boundary, and a first transition boundary position. The first outward facing portion may include filmholes oriented to direct cooling air leaving the filmholes outward of a reference edge of the surface structure and over a surface of the surface structure. The first inward facing portion may include filmholes oriented to direct cooling air leaving the filmholes inward toward the reference edge of the surface structure and over the surface of the surface structure. The first transition boundary may include a first point equidistant between the first outward facing portion and the first inward facing portion. The first transition boundary position may include a first distance of the first transition boundary from the reference edge of the surface structure.

The surface structure may further include a second filmrow having a second outward facing portion, a second inward facing portion, a second transition boundary and a second transition boundary position. The second outward facing portion may include filmholes oriented outward of the reference edge of the surface structure and over the surface of the surface structure. The second inward facing portion may include filmholes oriented inward toward the reference edge of the surface structure and over the surface of the surface structure. The second transition boundary may include a second point equidistant between the second outward facing portion and the second inward facing portion. The second transition boundary position may include a second distance of the second transition boundary from the reference edge of the surface structure. In various embodiments, the second transition boundary position differs by more than one-half-hole pitch from the first transition boundary position.

The surface structure may further include a third filmrow having a third outward facing portion, a third inward facing portion, a third transition boundary, and a third transition boundary position. The third outward facing portion may include filmholes oriented outward of the reference edge of the surface structure and over the surface of the surface structure. The third inward facing portion may include filmholes oriented inward toward the reference edge of the surface structure and over the surface of the surface structure. The third transition boundary comprising a third point equidistant between the third outward facing portion and the third inward facing portion. The third transition boundary position may include a third distance of the third transition boundary from the reference edge of the surface structure. In various embodiments, the third transition boundary position does not equal the first transition boundary position, wherein the third transition boundary position differs by more than one-half-hole pitch from the second transition boundary position.

In various embodiments, the surface structure may include a third filmrow and a fourth filmrow. The third filmrow may include a third outward facing portion having filmholes oriented outward of the reference edge of the surface structure and over the surface of the surface structure, a third inward facing portion having filmholes oriented inward toward the reference edge of the surface structure and over the surface of the surface structure, a third transition boundary having a third point equidistant between the third outward facing portion and the third inward facing portion, and a third transition boundary position having a third distance of the third transition boundary from the reference edge of the surface structure. The fourth filmrow may include a fourth outward facing portion having filmholes oriented outward of the reference edge of the surface structure and over the surface of the surface structure, a fourth inward facing portion having filmholes oriented inward toward the reference edge of the surface structure and over the surface of the surface structure, a fourth transition boundary having a fourth point equidistant between the fourth outward facing portion and the fourth inward facing portion, and a fourth transition boundary position including a fourth distance of the fourth transition boundary from the reference edge of the surface structure. The third transition boundary position may differ by less than one-half-hole pitch from the first transition boundary position whereby the first filmrow and the third filmrow form a first aligned set, and the second transition boundary position may differ by less than one-half-hole pitch from the fourth transition boundary position whereby the second filmrow and the fourth filmrow form a second aligned set.

In various embodiments, the surface structure may include at least one of an inner stator vane platform, an outer stator vane platform, a blade outer air seal, or a combustor panel.

A surface structure is disclosed with a filmhole pattern, the filmhole pattern including a plurality of filmrows having non-contiguous adjacent transition boundary positions. In various embodiments, the plurality of filmrows having non-contiguous adjacent transition boundary positions form a first aligned set and a second aligned set. In various embodiments, the surface structure includes at least one of an inner stator vane platform, an outer stator vane platform, a blade outer air seal, or a combustor panel.

In various embodiments each filmrow of the plurality of filmrows includes an outward facing portion having filmholes oriented outward of an reference edge of the surface structure and over a surface of the surface structure, and an inward facing portion having filmholes oriented inward toward the reference edge of the surface structure and over the surface of the surface structure, wherein a distance between mesial ends of the outward facing portion and the inward facing portion is less than a four-hole pitch.

In various embodiments, each filmrow includes an outward facing portion, an inward facing portion, a transition boundary, and a transition boundary position. In various embodiments, the outward facing portion includes filmholes oriented outward of a reference edge of the surface structure and over a surface of the surface structure. In various embodiments, the inward facing portion includes filmholes oriented inward toward the reference edge of the surface structure and over the surface of the surface structure. In various embodiments, the transition boundary includes a point equidistant between the outward facing portion and the inward facing portion. In various embodiments, the transition boundary position includes a distance of the transition boundary from the reference edge of the surface structure. In various embodiments, the transition boundary position of each filmrow differs by more than one-half-hole pitch from at least one other filmrow whereby the plurality of filmrows have non-contiguous adjacent transition boundary positions. In various embodiments, the transition boundary position of each filmrow differs by more than one-half-hole pitch from one adjacent filmrow whereby the plurality of filmrows have non-contiguous adjacent transition boundary positions. In various embodiments, the transition boundary position of each filmrow differs by more than one-half-hole pitch from two adjacent filmrows whereby the plurality of filmrows have non-contiguous adjacent transition boundary positions. In various embodiments, the transition boundary position of each filmrow differs by more than one-half-hole pitch from every other filmrow whereby the plurality of filmrows have non-contiguous adjacent transition boundary positions.

In various embodiments, each filmrow includes a first outward facing portion including filmholes oriented to direct cooling air leaving the filmholes outward of a reference edge of the surface structure and over a surface of the surface structure, a first inward facing portion including filmholes oriented to direct cooling air leaving the filmholes inward toward the reference edge of the surface structure and over the surface of the surface structure, a first transition boundary including a first point equidistant between the first outward facing portion and the first inward facing portion, and a first transition boundary position including a first distance of the first transition boundary from the reference edge of the surface structure. The filmrow may also include a second outward facing portion including filmholes oriented to direct cooling air leaving the filmholes outward toward the reference edge of the surface structure and over the surface of the surface structure, a second transition boundary including a second point equidistant between the second outward facing portion and the first inward facing portion, and a second transition boundary position including a second distance of the second transition boundary from the reference edge of the surface structure.

A method of forming a surface structure having a filmhole pattern in the surface structure is disclosed. The method may include forming a plurality of filmrows having non-contiguous adjacent transition boundary positions, wherein forming each of the plurality of filmrows includes forming an outward facing portion having filmholes oriented outward of an reference edge of the surface structure and over a surface of the surface structure, and forming an inward facing portion having filmholes oriented inward toward the reference edge of the surface structure and over the surface of the surface structure.

In various embodiments, the surface structure may include an inner stator vane platform, an outer stator vane platform, a blade outer air seal, or a combustor panel.

In various embodiments, a distance between mesial ends of the outward facing portion and the inward facing portion is less than a four-hole pitch.

In various embodiments, forming each of the plurality of filmrows further includes forming a transition boundary including a point equidistant between the outward facing portion and the inward facing portion, and forming a transition boundary position including a distance of the transition boundary from the reference edge of the surface structure. In various embodiments, the transition boundary position of each filmrow differs by more than one-half-hole pitch from at least one other filmrow whereby the plurality of filmrows have non-contiguous adjacent transition boundary positions. In various embodiments, the transition boundary position of each filmrow differs by more than one-half-hole pitch from one adjacent filmrow whereby the plurality of filmrows have non-contiguous adjacent transition boundary positions. In various embodiments, the transition boundary position of each filmrow differs by more than one-half-hole pitch from two adjacent filmrows whereby the plurality of filmrows have non-contiguous adjacent transition boundary positions. In various embodiments, the transition boundary position of each filmrow differs by more than one-half-hole pitch from every other filmrow whereby the plurality of filmrows have non-contiguous adjacent transition boundary positions.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein.

Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "pressure side" of an airfoil or a surface structure means the side of the airfoil or the surface structure having a shorter length and/or proximate to slower moving fluid and/or fluid at higher pressure as compared to the "suction side" of the airfoil or the surface structure. "Suction side" of an airfoil or a surface structure means the side of the airfoil or the surface structure having a longer length and/or proximate to faster moving fluid and/or fluid at a lower pressure as compared to the "pressure side" of the airfoil or the surface structure. Pointing or oriented "outward" means having a vector component extending at least partially outward, such as oriented to direct cooling air at least partially outward. Pointing "inward" means having a vector component extending at least partially inward, such as oriented to direct cooling air at least partially inward. Similarly, as used herein a "first direction" and a "second direction" comprise directions having a vector component extending at least partially in opposite directions, such as wherein the statement pointing in a "first direction" means having a vector component extending at least partially opposite the "second direction."

Figure 1:
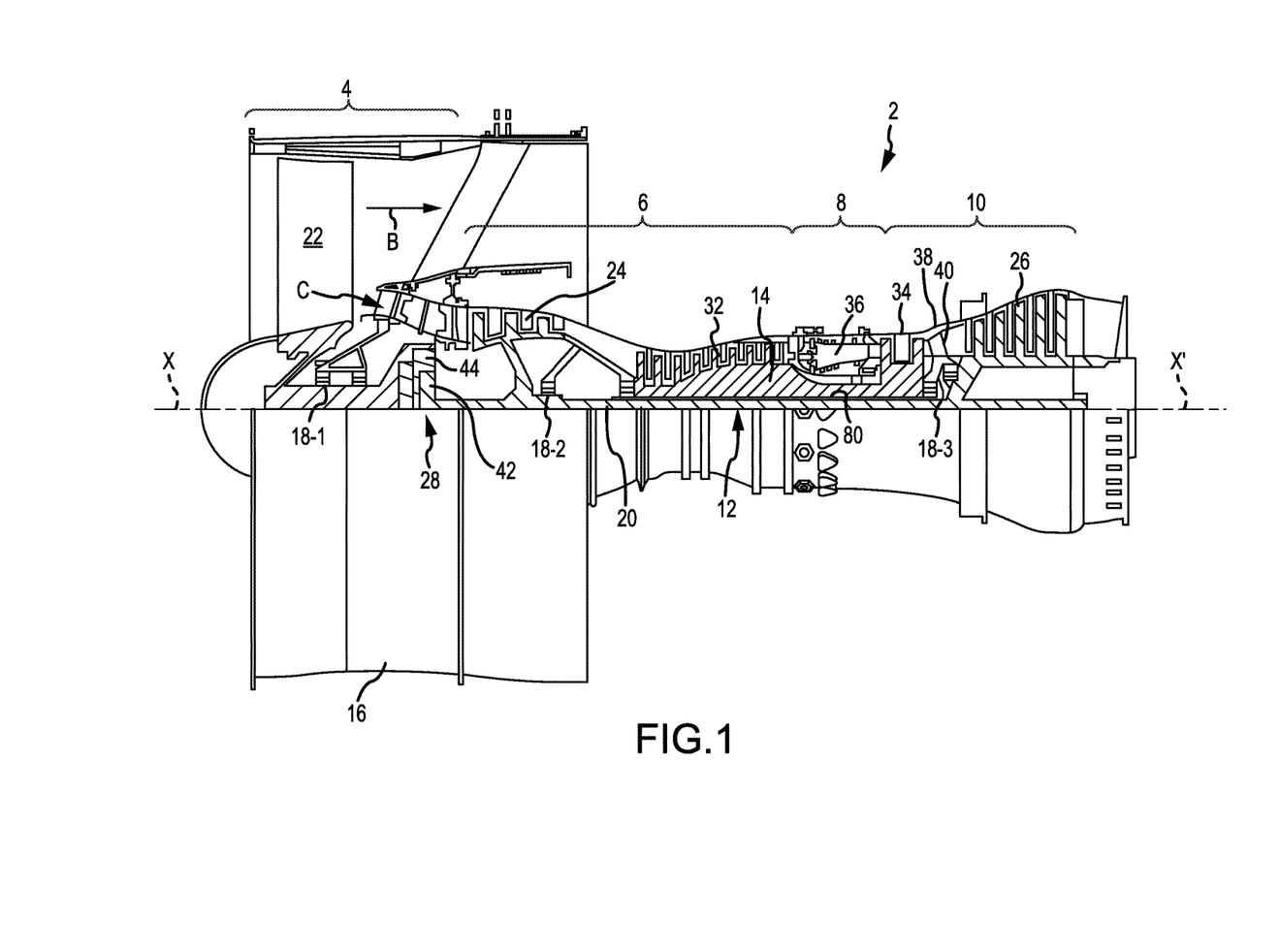
FIG. 1 illustrates a cross-sectional view of an exemplary gas turbine engine, according to various embodiments.
Figure 2:
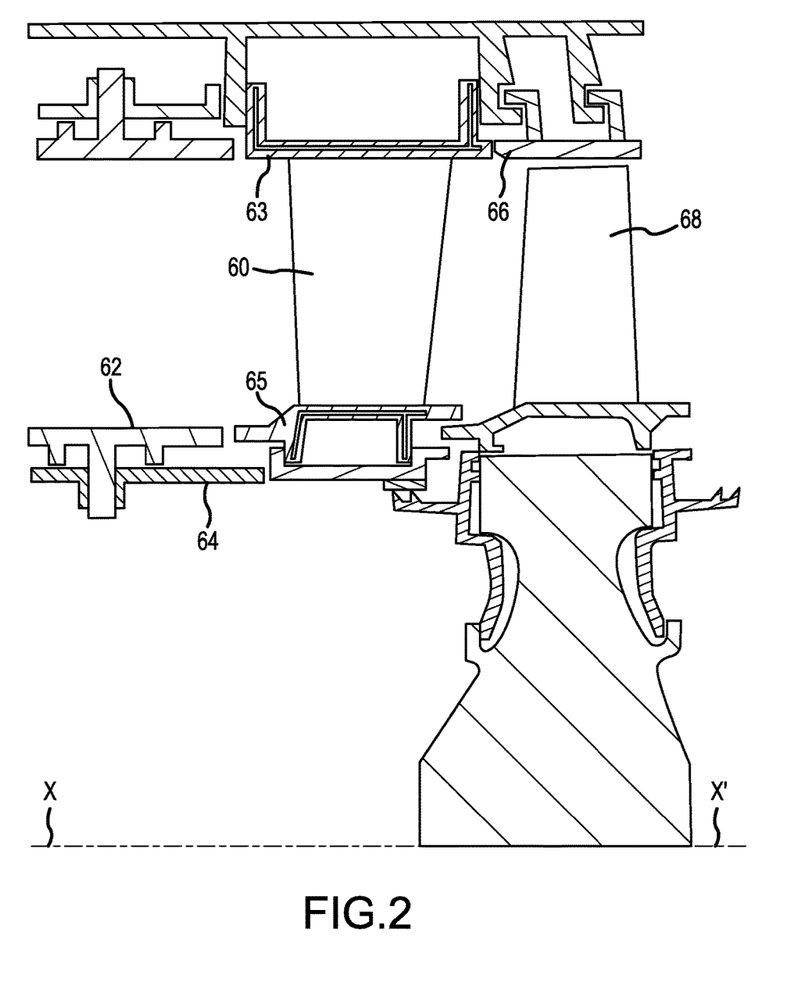
FIG. 2 illustrates example surface structures of an exemplary gas turbine engine, according to various embodiments.

With reference to FIGS. 1 and 2, an exemplary gas turbine engine 2 is provided. Gas turbine engine 2 is a two-spool turbofan that generally incorporates a fan section 4, a compressor section 6, a combustor section 8 and a turbine section 10. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about five (5). The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

The next generation of turbofan engines is designed for higher efficiency, which is associated with higher pressure ratios and higher temperatures in the high speed spool 14 and other engine sections. These higher operating temperatures and pressure ratios create operating environments that cause thermal loads that are higher than thermal loads conventionally encountered. Operating conditions in high pressure compressor section 32 are often approximately 1400° F. (approximately 760° C.) or more, and operating conditions in combustor 36 are often higher. Moreover, prior filmhole arrangements permit regions of localized temperature excursions, such as due to regions that are insufficiently cooled (such as insufficiently convectively cooled) due to the orientation of the filmholes. Various systems to address these challenges are presented herein.

Surface structures may have filmholes arranged in rows and each row may have at least one filmhole pointing in an outward direction and at least one filmhole pointing in an inward direction relative to a reference edge E-E' of the surface structure. Various regions of the surface structure may rely on the convection in the filmhole to reduce temperature of the surface structure and/or other proximate structures; however, multiple rows of filmholes often transition from groups of filmholes pointing outwardly and groups of filmholes pointing inwardly at various positions. As such, by staggering the transition of multiple rows of filmholes from groups pointing outward and groups pointing inward, the effectiveness of the convective cooling proximate to the transitions may be enhanced.

Stated differently, the present disclosure contemplates considering filmhole orientation. For instance, for filmholes arranged in rows ("filmrows"), each filmrow is divided into groups of filmholes. A first group may be oriented to direct cooling air leaving the filmhole generally outward relative to a reference edge E-E' of the surface structure over a surface of the surface structure, whereas a second group may be oriented to direct cooling air leaving the filmhole generally inward relative to a reference edge E-E' of the surface structure and over a surface of the surface structure. Between the first group and the second group of filmholes in each filmrow, a transition region exists. The transition region is the space between the first group and the second group wherein the filmholes of that filmrow do not generally direct cooling air wherein the filmholes of that filmrow change orientation. For instance, the transition region is bounded at one end by filmholes oriented to direct cooling air leaving the filmholes generally outward relative to a reference edge E-E' of the surface structure over a surface of the surface structure and at the other end by filmholes oriented to direct cooling air leaving the filmholes generally inward relative to a reference edge E-E' of the surface structure over a surface of the surface structure. Intentionally staggering the transition regions of adjacent filmrows tends to enhance the effectiveness of the convective cooling proximate to the transition regions by permitting the cooling air flowing from adjacent filmrows to cool each other's transition region. With reference to FIGS. 1 and 2, an engine 2 may comprise a rotor blade 68 or a stator vane 60. The engine 2 may comprise various surface structures. For instance, the stator vane 60 may have a surface structure such as an inner stator vane platform 65, or an outer stator vane platform 63. A combustor panel 62 may join a combustor liner 64 and may be a surface structure. Similarly, a blade outer air seal (BOAS) 66 may be a surface structure. Thus, a surface structure as discussed herein may comprise an inner stator vane platform 65, an outer stator vane platform 63, a combustor panel 62, a BOAS 66, and/or another structure as desired. While various aspects are described herein with reference to such features as offset herringbone filmhole patterns (with brief reference to FIGS. 4A-B and 5A-B), such aspects may be incorporated into other surfaces as desired.

For example, the transition region of each filmrow may be positioned at a different distance from a reference edge E-E' of the surface structure, so that the transition regions of adjacent filmrows do not align. In various embodiments, the transition region of alternating (e.g., every other) filmrows may align (first aligned set), while the transition region of the interleaved set of alternating (e.g., every other) filmrow may align (second aligned set), yet the aligned transition regions of the first aligned set and the aligned transition regions of the second aligned set may be positioned at a different distance from the reference edge E-E' of the surface structure. In various embodiments, the transition region of every third filmrow may align, so that there is a first aligned set, a second aligned set, and a third aligned set. Thus, one may appreciate, that numerous arrangements are contemplated wherein a given filmrow is flanked by adjacent filmrows having transition regions located at different distances from the reference edge E-E' of the surface structure than the given filmrow. Thus, a portion of cooling air from a filmrow may pass over and cool the transition region of one or more adjacent filmrows.

Moreover, an offset herringbone filmhole pattern 52 may comprise various arrangements. Though discussed in greater detail below, an offset herringbone filmhole pattern 52 may comprise a diverging offset pattern 74 (FIGS. 4A-B) or a converging offset pattern 76 (FIGS. 5A-B), or various other patterns, for instance a linear pattern as depicted in first circumferentially outboard portion filmhole group 73 and second circumferentially outboard portion filmhole group 77 of FIGS. 3, 6 and 7 that in various embodiments are circumferentially outboard of one or more stator vanes 60.

With reference now to FIGS. 3, 4A-B, 5A-B, 6, and 7, an offset herringbone filmhole pattern 52 is disclosed. In various embodiments the offset herringbone filmhole pattern 52 may comprise an arrangement of filmholes into filmrows 55 configured to cool the surface structure. For instance, the offset herringbone filmhole pattern 52 may comprise one or more filmrows 55. The offset herringbone filmhole pattern 52 may comprise a first filmrow 55-1, a second filmrow 55-2, a third filmrow 55-3, and a fourth filmrow 55-4. While four filmrows are depicted in FIGS. 4A-B and 5A-B for illustration purposes, one may appreciate that any number of filmrows configured to accomplish a desired cooling on a desired surface structure may be implemented, and any grouping of filmrows may comprise linear arrangements and may comprise arcuate or otherwise non-linear arrangements, or may comprise parallel and/or aligned groupings of filmrows.

Each filmrow 55-1, 55-2, 55-3, 55-4 may comprise an outward facing portion 90 (e.g., "first group of filmholes") and an inward facing portion 92 (e.g., "second group of filmholes"). For instance, the filmholes of each filmrow may be arranged into a row with filmholes oriented to direct cooling air from a channel inside the surface structure through and out of the surface of the surface structure. Relative to the reference edge E-E' of the surface structure, the outward facing portion 90 may comprise filmholes oriented to direct cooling air generally outward from the reference edge E-E' of the surface structure. Similarly, the inward facing portion 92 may comprise filmholes oriented to direct cooling air generally inward toward the reference edge E-E' of the surface structure. Because each filmrow 55-1, 55-2, 55-3, 55-4 may comprise an outward facing portion 90 and an inward facing portion 92, the first filmrow 55-1 may comprise a first outward facing portion 90-1 and a first inward facing portion 92-1, the second filmrow 55-2 may comprise a second outward facing portion 90-2 and a second inward facing portion 92-2, the third filmrow 55-3 may comprise a third outward facing portion 90-3 and a third inward facing portion 92-3, and the fourth filmrow 55-4 may comprise a fourth outward facing portion 90-4 and a fourth inward facing portion 92-4. Stated differently, the inward facing portion 92 may comprise filmholes oriented to direct cooling air in a direction with at least a partial vector component in an opposite direction of the cooling air from the outward facing portion 90. The outward facing portion 90 and the inward facing portion 92 may comprise filmholes oriented to direct cooling air in generally opposing directions, or in directions each having at least a partial vector component that is opposed to the other portion.

Figure 4A:
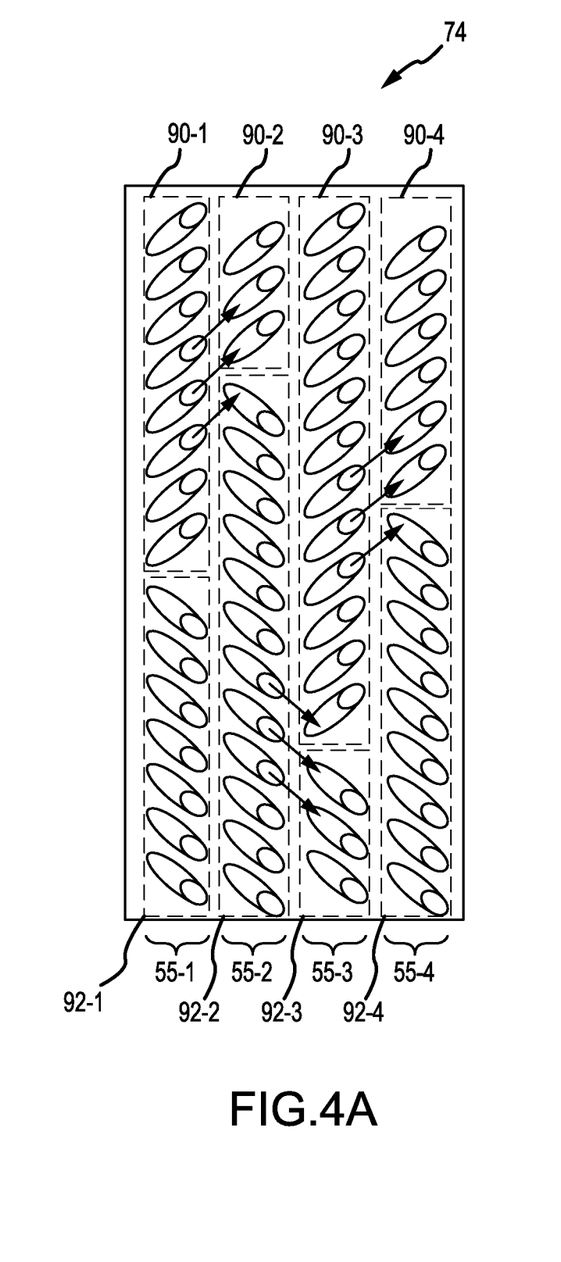
FIG. 4A-B illustrates an example outward oriented offset herringbone filmhole pattern, according to various embodiments.
Figure 5A:
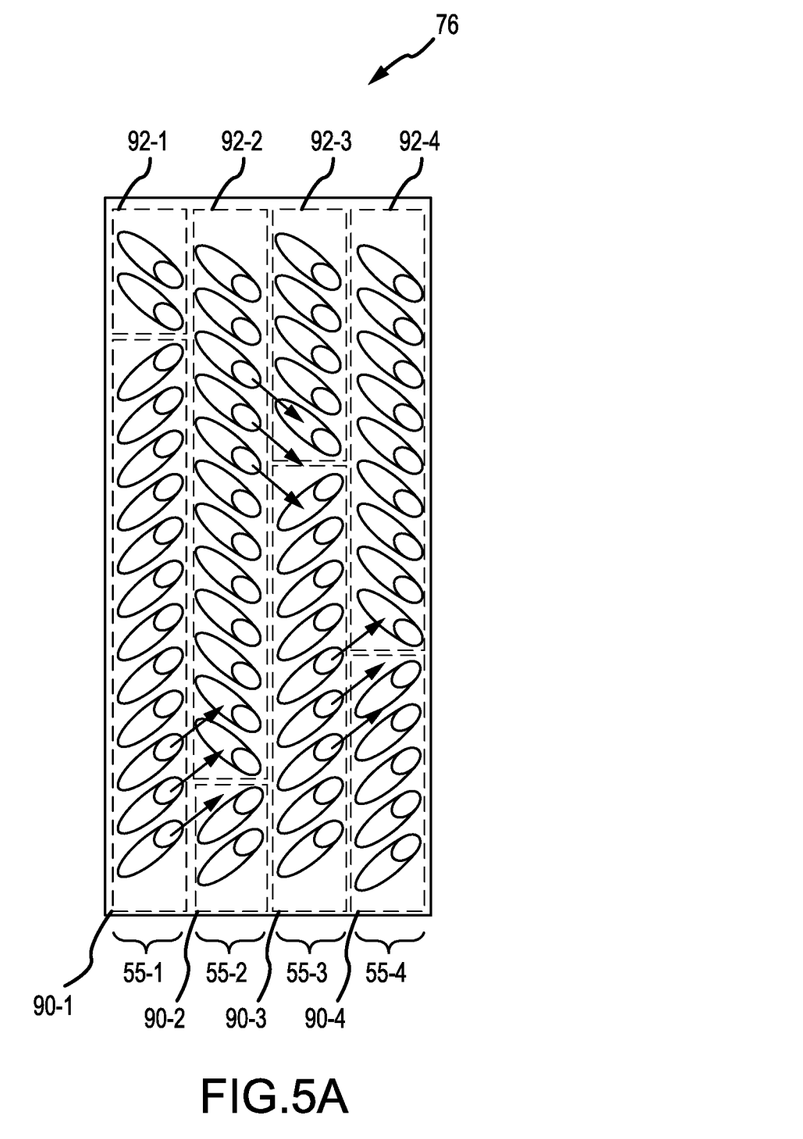
FIG. 5A-B illustrates an example inward oriented offset herringbone filmhole pattern, according to various embodiments.

In various embodiments, each outward facing portion 90-1, 90-2, 90-3, 90-4, is disposed inward of each corresponding inward facing portion 92-1, 92-2, 92-3, 92-4 relative to the reference edge E-E' of the surface structure, as seen in FIG. 5A. However, in various embodiments, each outward facing portion may be disposed outward of each corresponding inward facing portion relative to the reference edge E-E' of the surface structure, as seen in FIG. 4A. In various embodiments, the outward facing portion may be disposed outward of a corresponding inward facing portion of one adjacent filmrow, and inward of another adjacent filmrow. Thus, various arrangements are contemplated as desired to facilitate substantially uniform convective cooling of the surface structure.

Figure 4B:
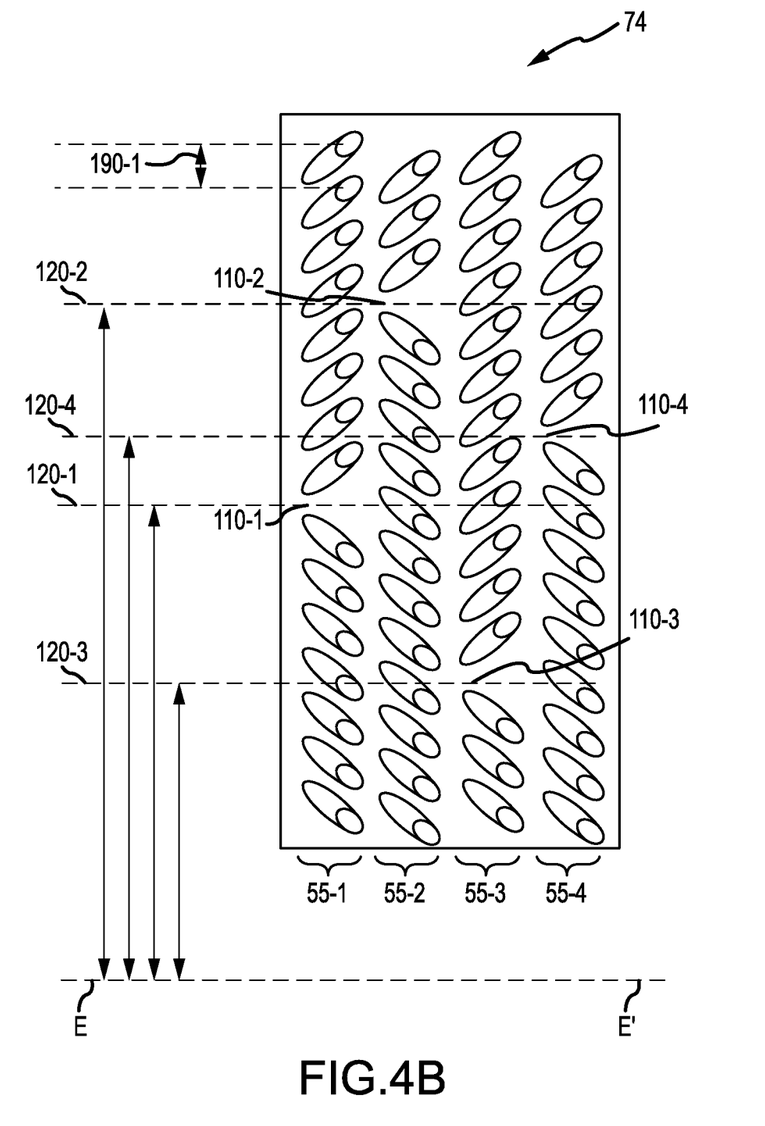
Figure 5B:
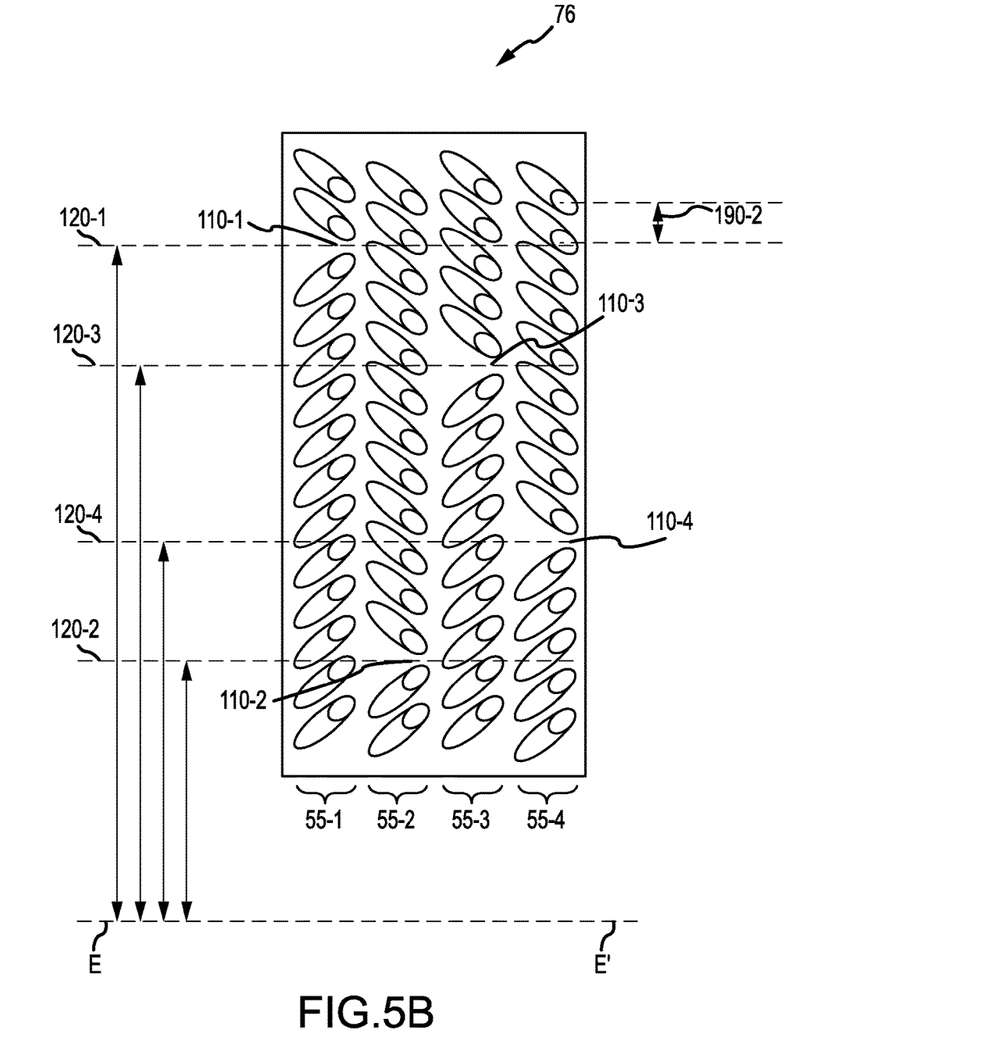

Each filmrow 55-1, 55-2, 55-3, 55-4 may further comprise a transition boundary. With reference to FIGS. 4B and 5B, for example, first filmrow 55-1 may comprise a first transition boundary 110-1, second filmrow 55-2 may comprise a second transition boundary 110-2, third filmrow 55-3 may comprise a third transition boundary 110-3 and forth filmrow 55-4 may comprise a fourth transition boundary 110-4. A transition boundary may comprise a point centered equidistant between the mesial ends of an outward facing portion of a filmrow and an inward facing portion of the same filmrow. For instance, first transition boundary 110-1 may be a point located equidistant between the mesial end of first inward facing portion 92-1 and first outward facing portion 90-1 of the first filmrow 55-1. Second transition boundary 110-2 may be a point located equidistant between the mesial end of second inward facing portion 92-2 and second outward facing portion 90-2 of the second filmrow 55-2. Third transition boundary 110-3 may be a point located equidistant between the mesial end of third inward facing portion 92-3 and third outward facing portion 90-3 of the third filmrow 55-3. Fourth transition boundary 110-4 may be a point located equidistant between the mesial end of fourth inward facing portion 92-4 and fourth outward facing portion 90-4 of the fourth filmrow 55-4.

With continued reference to FIGS. 4B and 5B, each filmrow may comprise a transition boundary position. For example, first filmrow 55-1 may comprise a first transition boundary position 120-1, second filmrow 55-2 may comprise a second transition boundary position 120-2, third filmrow 55-3 may comprise a third transition boundary position 120-3 and fourth filmrow 55-4 may comprise a fourth transition boundary position 120-4. A transition boundary position may comprise the distance of the corresponding transition boundary from the reference edge E-E' of the surface structure. Different filmrows may have different transition boundary positions. For instance, the transition boundary position of each filmrow may be positioned a different distance from the reference edge E-E' of the surface structure, so that the transition regions of adjacent filmrows do not align. In various embodiments, the transition boundary position of alternating (e.g., every other) filmrow may align (first aligned set), while the transition boundary position of interposed alternating (e.g., every other) filmrows may align (second aligned set), yet the aligned transition regions of the first aligned set and the aligned transition regions of the second aligned set may be positioned a different distance from the reference edge E-E' of the surface structure. As such, a non-contiguous adjacent transition boundary position may mean that the transition boundary position of each filmrow is different from at least one other filmrow, or is different from one adjacent filmrow, or is different from two adjacent filmrows, or is different from every other filmrow, or the like.

Thus, as depicted in FIGS. 4B and 5B, a first filmrow 55-1 may comprise a first transition boundary position 120-1 that is located a different distance from the reference edge E-E' of the surface structure than the second transition boundary position 120-2 of the second filmrow 55-2. Moreover, FIGS. 4B and 5B depict a third filmrow 55-3 with a third transition boundary position 120-3 that is located a different distance from the reference edge E-E' of the surface structure than both the first transition boundary position 120-1 and the second transition boundary position 120-3. Finally, a fourth filmrow 55-4 may have a fourth transition boundary position 120-4 that is located a different distance from the reference edge E-E' of the surface structure than the first transition boundary position 120-1, the second transition boundary position 120-2 and the third transition boundary position 120-3.

While each transition boundary position is depicted as a unique distance from the reference edge E-E' of the surface structure, in various embodiments, various transition boundary positions are located various distances from the reference edge E-E' of the surface structure so that non-adjacent transition boundary positions align. For instance, in various embodiments, each transition boundary position is disposed at a different distance from the reference edge E-E' of the surface structure than at least one adjacent transition boundary position. For instance, referring again to FIGS. 4B and 5B, the first transition boundary position 120-1 of a first filmrow 55-1 is disposed a different distance from the reference edge E-E' of the surface structure than the second transition boundary position 120-2 of the second filmrow 55-1. The third transition boundary position 120-3 of the third filmrow 55-1 may alternatively be disposed the same distance from the reference edge E-E' of the surface structure as the first transition boundary position 120-1 or may be disposed a different distance from the reference edge E-E' of the surface structure as both the first transition boundary position 120-1 and the second transition boundary position 120-2. As such, various embodiments are contemplated comprising filmrows 55-1, 55-2, 55-3, and 55-4 comprising non-contiguous adjacent transition boundary positions. In this manner, cooling air flowing from adjacent filmrows may variously cool adjacent transition boundaries through either convection from adjacent filmrows or film from upstream rows.

As used herein, "does not equal" as may be used in statements such as "wherein the second transition boundary position does not equal the first transition boundary position," means that the second transition boundary position and the first transition boundary position differ by greater than one-half the distance between individual filmholes of an outward facing portion and/or inward facing portion of a filmrow. Such transition boundary positions may be said to differ by greater than "one-half-hole pitch." Similarly, "the same distance" may mean equal to or less than "one-half-hole pitch" while "a different distance" may mean to differ by greater than "one-half-hole pitch." FIGS. 4B and 5B depict distances 190-1, 190-2 which each comprise one-hole pitch, or stated differently, which each comprise a distance between individual filmholes of an outward facing portion and/or inward facing portion of a film row. One-hole pitch, divided by two, equals "one-half-hole pitch."

Figure 6:
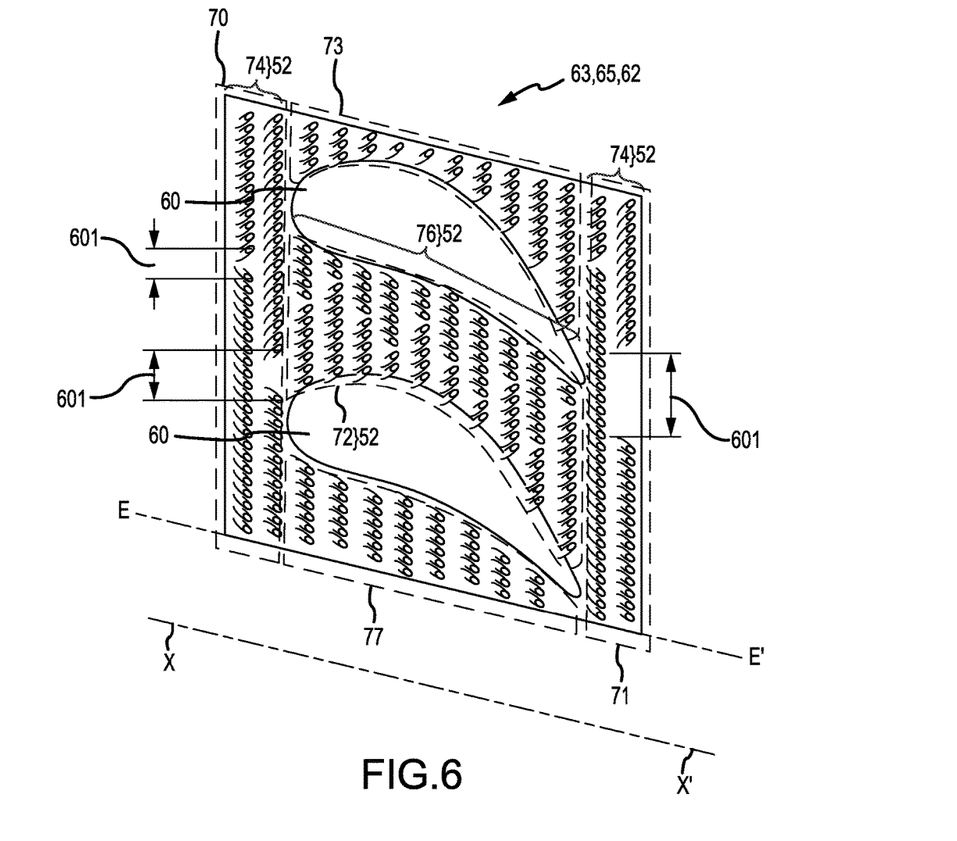
FIGS. 6-7 illustrate example surface structures comprising vane platforms having filmhole patterns with variable spacing, according to various embodiments.
Figure 7:
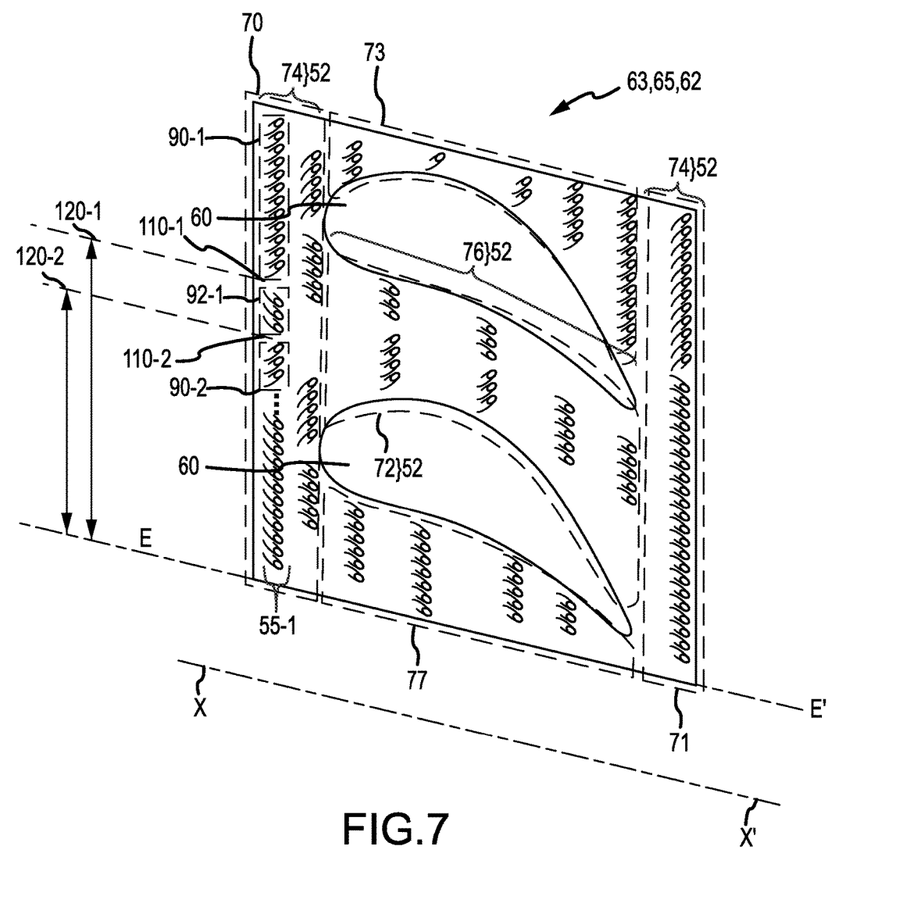

Briefly returning attention to FIGS. 4B and 5B, as well as with new reference to FIGS. 6-7 the transition boundary position of filmrows may in various embodiments be associated with a transition region of various sizes. In various embodiments, the width 601 of the transition region may be defined as the distance between the mesial ends of portions 90, 92. In various embodiments, this width 601 may comprise less than four times the distance of a one-hole pitch (e.g., less than "four-hole pitch"). In further embodiments, this width 601 may be greater than four-hole pitch. In further embodiments, this width 601 may be four-hole pitch. The transition width for each filmrow may be differing distances from filmrow to filmrow.

Moreover, various embodiments may include multiple transition regions in a given filmrow, as depicted in forward portion filmhole group 70 in FIG. 7. For instance, as shown in FIG. 7, such a filmhole group may have a film row 55-1 with a first outward facing portion 90-1 comprising filmholes oriented to direct cooling air leaving the filmholes outward of a reference edge of the surface structure and over a surface of the surface structure, a first inward facing portion 92-1 comprising filmholes oriented to direct cooling air leaving the filmholes inward toward the reference edge of the surface structure and over the surface of the surface structure, a first transition boundary 110-1 comprising a first point equidistant between the first outward facing portion 90-1 and the first inward facing portion 92-1, and a first transition boundary position 120-1 comprising a first distance of the first transition boundary 110-1 from the reference edge of the surface structure. Importantly, there may however be multiple transition regions in the same filmrow, for instance, as shown, there may exist a second outward facing portion 90-2 comprising filmholes oriented to direct cooling air leaving the filmholes outward toward the reference edge of the surface structure and over the surface of the surface structure, a second transition boundary 110-2 comprising a second point equidistant between the second outward facing portion 90-2 and the first inward facing portion 92-1, and a second transition boundary position 120-2 comprising a second distance of the second transition boundary 110-2 from the reference edge of the surface structure.

With reference to both FIGS. 6-7, such multiple transition regions may have various widths 601.

Figure 3:
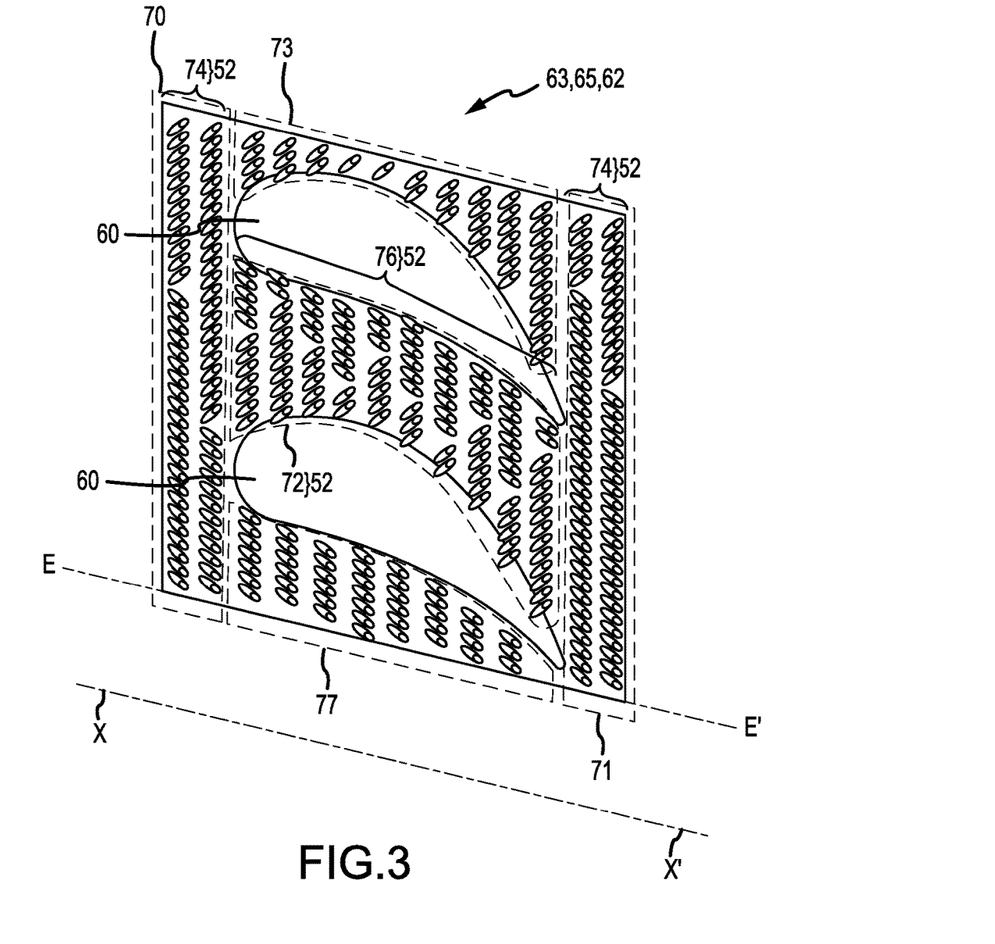
FIG. 3 illustrates an example surface structure comprising a vane platform having filmhole pattern(s), according to various embodiments.

With renewed reference now to FIGS. 3, 6, and 7, a surface structure comprising an inner stator vane platform 65 or an outer stator vane platform 63 is disclosed. The inner stator vane platform 65 or outer stator vane platform 63 ("platform") may comprise various different filmhole groups comprising different offset herringbone filmhole patterns. For example, a forward portion (relative to the vane and/or engine central longitudinal axis X-'X) and an aft portion (relative to the engine central longitudinal axis X-'X) and/or vane) may respectively comprise a forward portion filmhole group 70 and an aft portion filmhole group 71. Similarly, the circumferentially outboard (relative to one or more stator vane 60 extending from the stator vane platform) portions of the platform may comprise a first circumferentially outboard portion filmhole group 73 and a second circumferentially outboard portion filmhole group 77. Finally, the platform may comprise a central portion filmhole group 72, which in various embodiments may be circumferentially between a pair of stator vanes 60, and axially between the forward portion filmhole group 70 and the aft portion filmhole group 71.

Each filmhole group may include filmholes arranged according to a pattern, such as, a diverging offset pattern 74, or a converging offset pattern 75, or any pattern as desired. For instance, a forward portion filmhole group 70 may comprise a diverging offset pattern 74, an aft portion filmhole group 71 may comprise a diverging offset pattern 74, and a central portion filmhole group 72 may comprise a converging offset pattern 75, such as to facilitate manufacturability, such as to permit drilling without interference with stator vanes 60. Moreover, the first circumferentially outward portion filmhole group 73 and second circumferentially outward portion filmhole group 77 may comprise filmholes positioned in symmetric rows (e.g., rows and/or filmhole groups positioned in repeating patterns or otherwise as depicted in FIGS. 3, 6), and/or asymmetric rows (e.g., rows and/or filmhole groups positioned in non-repeating patterns or otherwise as depicted in FIG. 7).

In this manner, by implementing a variety of platform filmhole arrangements in an inner stator vane platform 65 and/or an outer stator vane platform 63, desired cooling properties may be achieved while further maintaining manufacturability, such as by permitting filmholes to be drilled, bored, or otherwise formed without interfering with stator vanes 60. In further embodiments, various features such as depicted in FIGS. 3, 4A-B, 5A-B, 6, and 7, for instance, a diverging offset pattern 74 or a converging offset pattern 76 may further be implemented in an inner stator vane platform 65 and/or an outer stator vane platform 63, and/or any other surfaces structure discussed herein, as may be the various features depicted in FIGS. 3, 4A-B, 5A-B, 6, and 7. Thus, while certain filmhole arrangements are depicted in certain figures for convenience, any disclosed filmhole arrangement may be combined in any combination on any disclosed surface structure, as desired.

With reference to FIGS. 1-7, having discussed aspects of a surface structure, a surface structure may be made of various materials. For instance, a surface structure may be made of a single material, or different materials, or combinations of materials. For example, components of the system are made from metal. For example, aspects of a surface structure are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of a surface structure as disclosed herein are optionally made of different materials or combinations of materials, and/or comprise coatings. Moreover, components of the surface structure are in some instances mixtures of different materials according to different ratios, gradients, and the like.

A surface structure thus has multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of forming a surface structure for a gas turbine engine, the method comprising:
    forming a plurality of filmrows, wherein forming each film row of the plurality of filmrows comprises:
        forming a first outward facing portion comprising first filmholes oriented to direct cooling air leaving the first film holes outward of a reference edge of the surface structure and over a surface of the surface structure;
        forming a first inward facing portion comprising second filmholes oriented to direct cooling air leaving the second film holes inward toward the reference edge of the surface structure and over the surface of the surface structure;
        forming a first transition boundary at a first location equidistant between an end of the first outward facing portion and an end of the first inward facing portion, whereby the first transition boundary is formed between the first outward facing portion and the first inward facing portion, and wherein a first transition boundary position is defined as a first distance of the first transition boundary from the reference edge of the surface structure;
    wherein forming the surface structure further comprises:
        forming a first set of at least two filmrows of the plurality of filmrows, the first set of at least two filmrows being formed with respective first transition boundary positions defining equal respective first distances;
        forming a second set of at least two filmrows of the plurality of filmrows, the second set of at least two filmrows being formed with respective first transition boundary positions defining equal respective first distances; and
        forming the first set of at least two filmrows and the second set of at least two filmrows such that the equal respective first distances of the first set of at least two filmrows do not equal the equal respective first distances of the second set of at least two filmrows.

2. The method of forming the surface structure according to claim 1, wherein the surface structure comprises at least one of an inner stator vane platform, an outer stator vane platform, and a blade outer air seal.

3. The method of forming the surface structure according to claim 1, wherein an intermediate distance between the end of the outward facing portion and the end of the inward facing portion comprises greater than a four-hole pitch.

4. The method of forming the surface structure according to claim 1,
    wherein the respective transition boundary position of each filmrow of the plurality of filmrows differs by more than one-half-hole pitch from one adjacent film row of the plurality of filmrows.

5. The method of forming the surface structure according to claim 1,
    wherein the respective transition boundary position of each filmrow of the plurality of filmrows differs by more than one-half-hole pitch from two adjacent film rows of the plurality of filmrows.

6. A surface structure for a gas turbine engine, the surface structure comprising a filmhole pattern, the filmhole pattern comprising a plurality of filmrows,
    wherein each filmrow of the plurality of film rows comprises:
        an outward facing portion comprising first film holes oriented to direct cooling air leaving the first filmholes outward of a reference edge of the surface structure and over a surface of the surface structure;
        an inward facing portion comprising second filmholes oriented to direct cooling air leaving the second filmholes inward toward the reference edge of the surface structure and over the surface of the surface structure;

a transition boundary at a location equidistant between an end of the outward facing portion and an end of the inward facing portion, whereby the transition boundary is between the outward facing portion and the inward facing portion; and a transition boundary position being defined as a first distance of the transition boundary from the reference edge of the surface structure;

wherein the filmhole pattern further comprises:

an offset arrangement wherein the transition boundary position of each film row of the plurality of filmrows is offset relative to a respective transition boundary position of at least one other filmrow of the plurality of filmrows;

wherein respective transition boundary positions of a first set of at least two filmrows of the plurality of filmrows each define equal respective first distances;

wherein respective transition boundary positions of a second set of at least two filmrows of the plurality of filmrows each define equal respective first distances, and wherein the equal respective first distances of the first set of at least two filmrows do not equal the equal respective first distances of the second set of at least two filmrows.

7. The surface structure according to claim 6, wherein the outward facing portion is a first outward facing portion, the inward facing portion is a first inward facing portion, the transition boundary is a first transition boundary, the transition boundary position is a first transition boundary position, and wherein each filmrow of the plurality of filmrows comprises:

a second outward facing portion comprising third filmholes oriented to direct cooling air leaving the third filmholes outward of the reference edge of the surface structure and over the surface of the surface structure.

8. The surface structure according to claim 7, wherein, in at least one filmrow of the plurality of filmrows, a first intermediate distance between the end of the first outward facing portion and the end of the first inward facing portion comprises greater than a four-hole pitch.

9. The surface structure according to claim 8, wherein, in the at least one filmrow of the plurality of filmrows, a second intermediate distance between the end of the second outward facing portion and the end of the first inward facing portion is different than the first intermediate distance.

10. The surface structure according to claim 6, wherein the offset arrangement further comprises the transition boundary position of each filmrow of the plurality of filmrows differing by more than one-half-hole pitch from the respective transition boundary position of the at least one other filmrow of the plurality of filmrows.

11. A surface structure for a gas turbine engine, the surface structure having a filmhole pattern, the film hole pattern comprising a first filmrow, a second filmrow, a third filmrow, and a fourth filmrow, wherein the first filmrow comprises:

a first outward facing portion comprising first film holes oriented to direct cooling air leaving the first filmholes outward of a reference edge of the surface structure and over a surface of the surface structure;

a first inward facing portion comprising second film holes oriented to direct cooling air leaving the second filmholes inward toward the reference edge of the surface structure and over the surface of the surface structure;

a first transition boundary at a first location equidistant between an end of the first outward facing portion and an end of the first inward facing portion, whereby the first transition boundary is between the first outward facing portion and the first inward facing portion; and a first transition boundary position being defined as a first distance of the first transition boundary from the reference edge of the surface structure;

wherein the second filmrow comprises:

a second outward facing portion comprising third filmholes oriented to direct cooling air leaving the third filmholes outward of the reference edge of the surface structure and over the surface of the surface structure;

a second inward facing portion comprising fourth filmholes oriented to direct cooling air leaving the fourth filmholes inward toward the reference edge of the surface structure and over the surface of the surface structure;

a second transition boundary at a second location equidistant between an end of the second outward facing portion and an end of the second inward facing portion, whereby the second transition boundary is between the second outward facing portion and the second inward facing portion; and a second transition boundary position being defined as a second distance of the second transition boundary from the reference edge of the surface structure;

wherein the third filmrow comprises:

a third outward facing portion comprising fifth filmholes oriented to direct cooling air leaving the fifth filmholes outward of the reference edge of the surface structure and over the surface of the surface structure;

a third inward facing portion comprising sixth filmholes oriented to direct cooling air leaving the sixth filmholes inward toward the reference edge of the surface structure and over the surface of the surface structure;

a third transition boundary at a third location equidistant between an end of the third outward facing portion and an end of the third inward facing portion, whereby the third transition boundary is between the third outward facing portion and the third inward facing portion; and a third transition boundary position being defined as a third distance of the third transition boundary from the reference edge of the surface structure; and wherein the fourth filmrow comprises:

a fourth outward facing portion comprising seventh filmholes oriented to direct cooling air leaving the seventh film holes outward of the reference edge of the surface structure and over the surface of the surface structure;

a fourth inward facing portion comprising eighth filmholes oriented to direct cooling air leaving the eighth filmholes inward toward the reference edge of the surface structure and over the surface of the surface structure;

a fourth transition boundary at a fourth location equidistant between an end of the fourth outward facing portion and an end of the fourth inward facing portion, whereby the fourth transition boundary is between the fourth outward facing portion and the fourth inward facing portion; and a fourth transition boundary position being defined as a fourth distance of the fourth transition boundary from the reference edge of the surface structure, wherein:

the first distance equals the third distance, whereby the first transition boundary position is aligned with the third transition boundary position such that the first filmrow and the third filmrow comprises a first aligned set;

the second distance equals the fourth distance, whereby the second transition boundary position is aligned with the fourth transition boundary position such that the second film row and the fourth filmrow comprises a second aligned set; and the first distance is different than the second distance by more than one-half-hole pitch.

12. The surface structure according to claim 11, wherein the first film row is adjacent the second filmrow, the second filmrow is adjacent the third filmrow, and the third filmrow is adjacent the fourth filmrow.

13. The surface structure according to claim 11, wherein the surface structure comprises at least one of an inner stator vane platform, an outer stator vane platform, a blade outer air seal, or a combustor panel.

* * * * *